No. 764,152. PATENTED JULY 5, 1904.
D. ROCHE.
COUPLING FOR RAILWAY OR OTHER VEHICLES.
APPLICATION FILED JUNE 22, 1903.
NO MODEL. 3 SHEETS—SHEET 1.
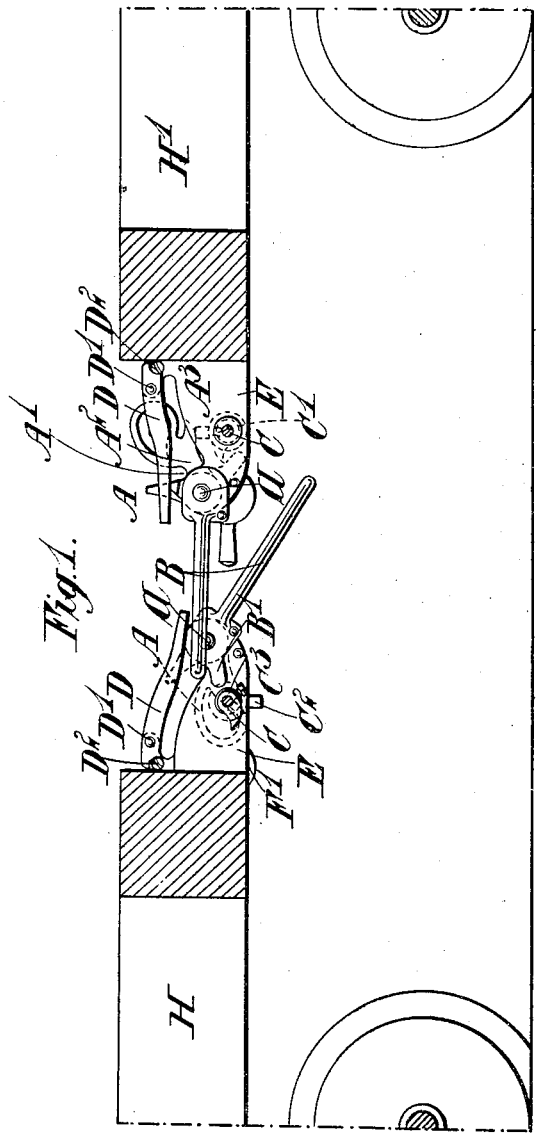
Witnesses
Inventor
David Roche,
By Wm. E. Coulter,
Attorney No. 764,152. PATENTED JULY 5, 1904.
D. ROCHE.
COUPLING FOR RAILWAY OR OTHER VEHICLES.
APPLICATION FILED JUNE 22, 1903.
NO MODEL. 3 SHEETS—SHEET 2.
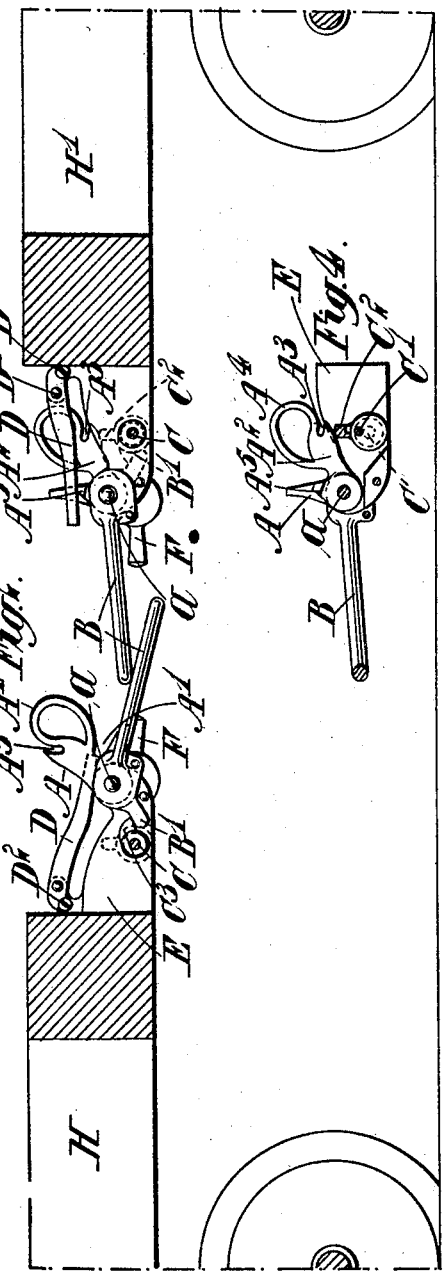
Witnesses
Inventor
David Roche
Attorney

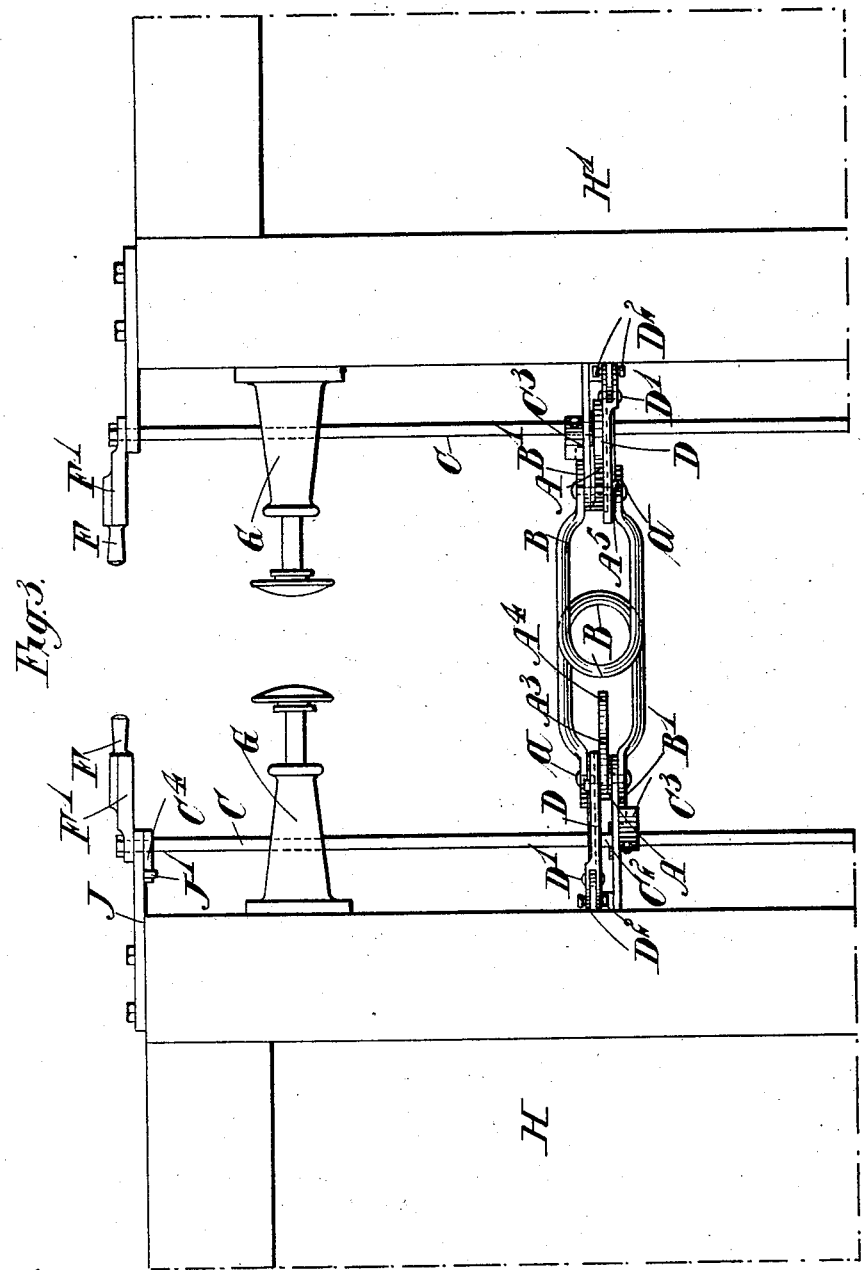

No. 764,152.

Patented July 5, 1904.

UNITED STATES PATENT OFFICE.

DAVID ROCHE, OF EALING, ENGLAND.

COUPLING FOR RAILWAY OR OTHER VEHICLES.

SPECIFICATION forming part of Letters Patent No. 764,152, dated July 5, 1904.

Application filed June 22, 1903. Serial No. 162,642. (No model.)

*To all whom it may concern:*

Be it known that I, DAVID ROCHE, a subject of the King of England, residing at Ealing, in the county of Middlesex, England, have invented certain new and useful Improvements in or Relating to Couplings for Railway or other Vehicles, of which the following is a specification.

This invention relates to couplings for railway and other vehicles and similar purposes, and refers more particularly to that class of coupling known as "automatic."

The chief object of the invention is to provide a coupling which can readily be operated automatically or by hand to engage the vehicles and as readily operated from the side of the vehicle to release the coupling irrespective of the load or strain which may be on it.

According to this invention there is mounted on a spring-controlled or other draw-bar at the end of the vehicle a rotatable or tumbling hook adapted to be engaged by a link or its equivalent on the end of the contiguous vehicle, so that when the vehicles come together the link or the like on one vehicle is guided into an opening in the hook, causing it to rotate on its pivot and in rotating to operate a locking-pin or similar device, which engages with the tumbling-hook and secures it in position. The pivot on which the hook is mounted is such and the opening in the hook in which the link rests is such relatively to the draw-bar that any pull brought to bear on the coupling is in alinement with its longitudinal axis. The locking-pin, which is operated by the hook as it rotates, is so mounted that when a pull is put upon the coupling none of the load bears upon the locking-pin. The draw-bar head is preferably double or with a central recess or opening, at the outer end of which is mounted the pivot-pin on which the tumbling hook is mounted. The draw-bar head also carries the rotatable shaft, having a cam eccentric or a crank with which the hook when it rotates, as above described, engages to rotate the shaft and cause the locking-pin carried by the shaft or the eccentric thereon to engage with an opening or recess on the hook to secure the coupling. The opening at the outer end of the hook is formed close to the pivot and in such position that when the hook is in its open position this slot points toward the contiguous vehicle or away from the vehicle on which the hook is mounted, so that the link on the opposite vehicle passes into the opening, and as the vehicles come together the hook is caused to rotate and to be locked, as above described. In order to insure that the link of the contiguous vehicle will be guided into its proper position and caused to press the hook downward to rotate the aforementioned eccentric, a pivoted or other presser-arm capable of movement within certain limits is mounted on the draw-bar head or other adjacent part and adapted to lie above the hook, and as this lever is prevented from rising it forces the link down onto a shoulder or extension on the hook, forcing it downward into engagement with the cam, and thereby causing the shaft to rotate. In addition to the hook above described each draw-bar head is preferably provided with a coupling-link, so that either the hook or the link may be brought into action, as desired, and when two vehicles come together the link on the higher vehicle will engage with the hook on the lower one, the other parts of the couplings being out of action. The link of one vehicle is guided into the opening of the hook preferably by the link of this vehicle, and in order that the link may be in position to form a guide it is provided with an extension which engages with an eccentric or arm upon the locking-shaft carried by the draw-bar head, or, if desired, any other convenient form of stop may be provided with the hook to retain the opening therein in the correct position for coupling. For releasing the vehicle without necessitating any one passing between them the locking-shaft is extended across the end of the vehicle and carries at either or both ends a counterbalance-lever, which is held in either of its extreme positions by suitable stops.

Referring to the drawings, Figure 1 is a sectional side elevation showing the coupling in its locked or coupled position. Fig. 2 is a similar view showing the parts open or released. Fig. 3 is a plan of Fig. 1, and Fig. 4 is a detailed view of the coupling-hook and locking mechanism.

A is a coupling-hook; B, the coupling-link; C, the locking-shaft; D, a presser or guiding lever.

E is the draw-bar head, and F the operating-lever.

In a preferred form each end of the vehicle carries a spring-controlled or other draw-bar head E, on which is mounted a coupling-hook A and a coupling-link B. The hook A is mounted on a short shaft or pivot $a$, on which it rotates, and in the uncoupled position the jaws A' of the hook are directed toward the adjacent vehicle and the link B, which is also mounted on the shaft $a$, acts when not employed for coupling as a guide for the link on the adjacent vehicle to direct said link into the jaws A' of the hook. When the vehicles come together, the coupling-link B, say, of the right-hand vehicle H' is guided by the link of the left-hand vehicle H and passes into the opening A' in the hook A of the vehicle H, and when the end of the link comes against the inner end of the jaws the hook A rotates on its pivot $a$ and after it has tumbled over a part $A^2$ of the hook bears on a crank $C^2$, mounted on the locking-shaft C, which is carried in suitable bearings in the draw-bar head, and causes the shaft C to rotate in such a manner that when the crank $C^2$ moves through a certain distance the pin C', which is mounted eccentrically on the shaft C, passes into engagement with a slot $A^3$ in the hook A and securely locks the hook in position. It is to be noted that when the hook A is in the coupled position the jaw lies approximately in the line of the pivot, so that the pulling strain is taken entirely by the pivot and none of the stress comes upon the locking-pin C'. Preferably the jaws are allowed to fall below the pivot, and when the coupling is to be released the eccentric or crank $C^2$ bears against the hook immediately the pin C' is moved out of the slot $A^3$ and raises the hook above the center of the pivot, so that when a pull is brought to bear on the hook by the link it rotates freely on its pivot to release the coupling. In order to prevent the coupling-link B from rising too far and cause it to operate the locking shaft, a presser-lever D is pivoted to the draw-bar head above the path of the link B, and this lever is prevented from rising by means of a stop $D^2$ on the draw-bar head. The lever D is permitted to turn on its pivot D', but is retained in position to permit the link to pass between it and the pivot of the hook by means of a stop $A^5$, carried by the hook. The coupling-link which for the time being is acting as a guide for the coupling-link of the other vehicle is retained in proper position by a stop $C^3$, carried on the locking-shaft C, which bears on a shoulder B' of the coupling-link. The shaft C extends across the end of the vehicle and is carried in suitable bearings J at each side thereof, and to facilitate the operation of the shaft by hand a lever F is provided having a counterbalance F'. The lever is prevented from moving too far by means of a stop $C^4$, which engages with a corresponding stop J' on the vehicle.

G represents the ordinary spring-controlled buffers which can be employed with this coupling, and, if desired, the coupling may be duplicated, in which case one draw-bar may have a coupling-hook and the other draw-bar on the same vehicle be provided with the coupling-link, a guide for the link being provided on the draw-bar carrying the coupling-hook. It is to be noted that when in the coupled position the locking-pin is so disposed that any pull brought to bear on the coupling-hook tends to move the pin farther into the slot in the hook.

As shown in Fig. 1, the hook on the vehicle H' which is not being employed for coupling is shown in its turned-over or closed position; but generally both hooks will be open to be engaged by the links of the opposite vehicles, if desired, the height of the vehicle consequent on the load thereon determining which link will act as a guide and which as the coupling-link.

To uncouple the vehicles, the lever F at either side of the vehicle is rotated, and after the pin C' moves out of the slot $A^3$ the eccentric $C^2$ raises the hook above the center of the pivot $a$ and permits the hook to open and release the link, when the vehicles move apart.

What I claim as my invention, and desire to secure by Letters Patent, is—

1. In a car-coupling the combination with a hook turning in a vertical plane, of a transverse shaft, a crank on the shaft and means for holding the crank in position to be struck by the tailpiece of the coupling-hook during the movement of the latter into the coupling position and a pin on the crank arranged to enter a slot of the coupling-hook when the crank has been carried beyond its dead-center by the coupling-hook in order to lock the latter, substantially as described.

2. In a car-coupling the combination with a rotatable hook turning in a vertical plane, of a transverse shaft, a crank on said shaft, a weighted lever on the shaft holding the crank in position to be struck by the tailpiece of the coupling-hook during the movement of the latter into the coupling position, a pin secured to the crank-lever adapted to enter a slot and means whereby the weighted lever carries the crank beyond the dead-point so that the pin in the slot locks the coupling.

3. In a car-coupling the combination with a draw-bar, of a rotatable coupling-hook pivoted to the draw-bar, a locking device adapted to engage with the hook in its coupled position, means whereby the coupling-link of an adjacent vehicle rotates the hook, means whereby the hook in rotating operates the locking device and means for guiding the coupling-link of an adjacent vehicle into the hook.

4. In a car-coupling the combination with a draw-bar, of a rotatable coupling-hook pivoted thereto, a locking device adapted to engage with the hook in its coupled position, means for guiding the coupling-link of an adjacent vehicle into the hook, means whereby the said coupling-link rotates the hook, means whereby the hook in rotating operates the locking device and means for releasing the hook from the side of the vehicle.

5. In a car-coupling the combination with a draw-bar, of a rotatable coupling-hook pivoted to the bar, a locking device adapted to engage with the hook in its coupled position, means for guiding the coupling-link of an adjacent vehicle into the jaws of the hook, means causing the said link to rotate the hook, means for pressing the said link downward when rotating the hook, means causing the said hook to operate the locking device and means for releasing the coupling.

6. In a car-coupling the combination with a draw-bar, of a rotatable coupling-hook pivoted to the draw-bar and having an opening the longitudinal axis of which is slightly above the pivot, a rotatable locking device mounted in the draw-bar and operated to engage the hook when the latter is rotated and a guide mounted on the draw-bar to direct the coupling member of an adjacent vehicle into the opening of the hook substantially as described.

7. In a car-coupling the combination with a draw-bar, of a rotatable coupling-hook pivoted to the draw-bar, a rotatable shaft mounted in the draw-bar, a locking-pin carried by the shaft and adapted to engage the hook in its coupled position and a projection on the shaft against which the hook bears by rotating the shaft in coupling and which raises the hook when uncoupling.

8. In a car-coupling the combination with a divided draw-bar, of a rotatable coupling-hook pivoted within the draw-bar, a rotatable shaft mounted in the draw-bar, an eccentric locking-pin carried by the shaft and adapted to engage the hook in its coupled position and a crank on the shaft against which the hook bears to rotate the shaft in coupling and which raises the hook when the shaft is turned in uncoupling.

9. In a car-coupling the combination with a draw-bar, of a rotatable coupling-hook pivoted to the bar, a rotatable shaft mounted in the bar, a locking-pin carried by the shaft and adapted to engage the hook in its coupled position, an eccentric on the shaft against which the hook bears to cause the locking-pin to engage the hook and which raises the hook when uncoupling and means for releasing the coupling by hand from the side of the vehicle.

10. In a car-coupling the combination with a draw-bar, of a rotatable coupling-hook pivoted to the draw-bar, a rotatable shaft mounted in the draw-bar, an eccentric locking-pin carried by the shaft and adapted to engage the hook in its coupled position, an eccentric on the shaft against which the hook bears to engage the pin with a recess in the hook, a coupling-link mounted on the pivot-pin of the hook and a stop on the shaft to engage with the coupling-link, substantially as described.

11. In a car-coupling the combination with a draw-bar, of a divided head carried by the bar, a rotatable coupling-hook pivoted in the head, a rotatable shaft mounted on the head, an eccentric locking-pin carried by the shaft, a crank on the shaft against which the hook bears to engage the locking-pin with the hook and which raises the hook when uncoupling, a coupling-link mounted on the pivot-pin of the hook and adapted when not in use for coupling to act as a guide for the coupling-link of an adjacent vehicle to direct said link into the jaws of the hook, a stop on the rotatable shaft adapted to engage a shoulder on the coupling-link to raise it or lower it as desired and means for releasing the coupling substantially as described.

12. In a car-coupling the combination with a draw-bar, of a rotatable coupling-hook pivoted to the draw-bar, a rotatable shaft mounted on the draw-bar, an eccentric locking-pin carried by the shaft and adapted to engage the hook into coupling position, a crank on the shaft, a projection on the hook adapted to engage with the crank to cause the locking-pin to engage with a recess in the hook and means for releasing the coupling from the side of the vehicle, substantially as described.

13. In a car-coupling the combination with a draw-bar of a divided head carried by the bar, a rotatable coupling-hook pivoted in the head, a rotatable shaft mounted in the draw-bar head, a crank on the shaft, an eccentric-pin mounted between the cheeks of the crank, a projection on the coupling-hook adapted to engage with the crank on the rotatable shaft, a projection on the hook against which the coupling-link of an adjacent vehicle bears and presses the hook downward after retaining it, thereby causing the hook to engage with the crank and rotate the shaft, a coupling-link mounted on the pivot-pin of the coupling-hook, a stop on the rotatable shaft and a shoulder on the coupling-link with which the stop engages, substantially as and for the purpose described.

14. In a car-coupling the combination with a draw-bar of a divided head carried by the bar, a rotatable coupling-hook pivoted in the head, a rotatable shaft mounted in the draw-bar head, a crank on the shaft, an eccentric-pin mounted between the cheeks of the crank, a projection on the coupling-hook adapted to engage with the crank on the rotatable shaft, a projection on the hook against which the coupling-link of an adjacent vehicle bears and presses the hook downward after retaining it, thereby causing the hook to engage with the crank and rotate the shaft, a coupling-link mounted on the pivot-pin of the coupling-hook, a stop on the rotatable shaft, a shoulder on the coupling-link with which the stop engages, and a pivoted presser-bar for guiding the said coupling-link of the adjacent vehicle, substantially as and for the purpose described.

15. In a car-coupling the combination with a draw-bar of a divided head carried by the bar, a rotatable coupling-hook pivoted in the head, a rotatable shaft mounted in the draw-bar head, a crank on the shaft, an eccentric-pin mounted between the cheeks of the crank, a projection on the coupling-hook adapted to engage with the crank on the rotatable shaft, a projection on the hook against which the coupling-link of an adjacent vehicle bears and presses the hook downward after retaining it, thereby causing the hook to engage with the crank and rotate the shaft, a coupling-link mounted on the pivot-pin of the coupling-hook, a stop on the rotatable shaft, a shoulder on the coupling-link with which the stop engages, a pivoted presser-bar for guiding the said coupling-link of the adjacent vehicle, a stop for preventing the presser-bar rising and a stop on the rotatable hook for preventing the presser-bar from dropping too far, substantially as and for the purpose described.

16. In a car-coupling the combination with a draw-bar of a divided head carried by the bar, a rotatable coupling-hook pivoted in the head, a rotatable shaft mounted in the draw-bar head, a crank on the shaft, an eccentric-pin mounted between the cheeks of the crank, a projection on the coupling-hook adapted to engage with the crank on the rotatable shaft, a projection on the hook against which the coupling-link of an adjacent vehicle bears and presses the hook downward after retaining it, thereby causing the hook to engage with the crank and rotate the shaft, a coupling-link mounted on the pivot-pin of the coupling-hook, a stop on the rotatable shaft, a shoulder on the coupling-link with which the stop engages, a pivoted presser-bar for guiding the said coupling-link of the adjacent vehicle, a stop for preventing the presser-bar rising, a stop on the rotatable hook for preventing the presser-bar from dropping too far and a counterbalance-lever at the side of the vehicle, substantially as and for the purpose described.

17. In a car-coupling the combination with a divided draw-bar head, of a rotatable coupling-hook pivoted to the draw-bar head, the draw-bar head being recessed or notched to permit the coupling-link of an adjacent vehicle to drop behind and in line with the axis of the pivot of the hook when the vehicles are coupled, a rotatable shaft mounted in the draw-bar head, a crank on the shaft, an eccentric-pin mounted between the cheeks of the crank, a projection on the coupling-hook adapted to engage with the crank on the rotatable shaft, a projection on the hook against which the coupling-link of an adjacent vehicle bears and presses the hook downward after retaining it, thereby causing the hook to engage with the crank and rotate the shaft, a coupling-link mounted on the pivot-pin of the coupling-hook, a stop on the rotatable shaft, a shoulder on the coupling-link with which the stop engages, a pivoted presser-bar for guiding the said coupling-link of the adjacent vehicle, a stop for preventing the presser-bar rising, a stop on the rotatable hook for preventing the presser-bar from dropping too far, and a counterbalance-lever at the side of the vehicle, substantially as and for the purpose described.

In testimony whereof I have signed my name to this specification in the presence of two subscribing witnesses.

DAVID ROCHE.

Witnesses:
 HERBERT MALTBY,
 WALTER J. SKERTEN.